US008463688B2

(12) United States Patent
Ritterman et al.

(10) Patent No.: US 8,463,688 B2
(45) Date of Patent: Jun. 11, 2013

(54) RESEARCHING EXCHANGE-LISTED PRODUCTS USING SENTIMENT

(75) Inventors: Joshua Ritterman, Kowloon Bay (CN); Mark O. Munoz, Hong Kong (CN); Nathan D. Emerson, Hong Kong (CN)

(73) Assignee: Investlab Technology Limited, Hong Kong (CN)

( * ) Notice: Subject to any disclaimer, the term of this patent is extended or adjusted under 35 U.S.C. 154(b) by 23 days.

(21) Appl. No.: 13/079,678

(22) Filed: Apr. 4, 2011

(65) Prior Publication Data

US 2012/0254063 A1    Oct. 4, 2012

(51) Int. Cl.
*G06Q 40/00* (2012.01)
(52) U.S. Cl.
USPC ....................................................... 705/36 R
(58) Field of Classification Search
None
See application file for complete search history.

(56) References Cited

U.S. PATENT DOCUMENTS

| 6,510,419 | B1* | 1/2003 | Gatto | 705/36 R |
| 8,166,032 | B2* | 4/2012 | Sommer et al. | 707/736 |
| 2006/0242040 | A1* | 10/2006 | Rader | 705/35 |
| 2009/0006268 | A1* | 1/2009 | Tanner | 705/36 R |
| 2011/0258256 | A1* | 10/2011 | Huberman et al. | 709/204 |

\* cited by examiner

*Primary Examiner* — Olabode Akintola
(74) *Attorney, Agent, or Firm* — Cooley LLP

(57) ABSTRACT

A metric, such as price, is estimated for an exchange-listed product based on public sentiment regarding the exchange-listed product. A system for estimating a metric for an exchange-listed product receives data from an external server. The data may be received from a social media website, and may represent user-generated data in natural language form. The system identifies a portion of the data and determines whether the portion represents a positive sentiment or a negative sentiment. The system estimates a metric for the exchange-listed product based on the sentiment represented by the data. The system may combine the metric based on sentiment with other metrics to create an averaged metric. The other metrics may be obtained using analyst consensus estimates as well as technical analyses of market information for the exchange-listed product.

14 Claims, 8 Drawing Sheets

RESEARCHING EXCHANGE-LISTED PRODUCTS USING SENTIMENT

BACKGROUND

1. Field

The present application generally relates to a computer-based system for investment market research. More specifically, the present application relates to a system for researching an exchange-listed product by analyzing: (i) public sentiment, (ii) analyst consensus estimates, and/or (iii) technical analyses of market information for the exchange-listed product.

2. Related Art

Computer-based systems for investment market research have long been used by professional investors to identify potential valuation anomalies among investment vehicles. A valuation anomaly in an investment vehicle is important because it represents potential profit opportunities for investors. In general, a computer-based market research system analyzes a number of input sources, and applies a particular strategy to predict the future value of an investment vehicle. As such, access to holistic market information is important to a computer-based market research system. The accessing of holistic market information, however, poses certain challenges for computer-based investment market research systems.

For instance, a traditional computer-based market research system may not be designed to obtain holistic market information. Instead, a traditional system may obtain, as input, certain technical data including historical prices and financial statistics for a number of exchange-listed products. Technical data provides a historical view of market realities, and allows a market research system to predict stock values by extrapolating trends in the market. The extrapolations, however, may not reflect current public sentiment towards the particular stock, meaning that a future valuation may be based on incomplete market information. As used here, sentiment generally refers to an opinion, emotion, evaluation, or the like, that may range from being positive, to neutral, to negative.

Additionally, traditional computer-based market research systems may not process financial news information that appear in natural-language form. Although multiple sources of news related to a single stock may be funneled into a computer-based data feed, a human reader must still analyze each news article to determine the public's sentiment towards the stock embodied in the news article. The time and cost involved in analyzing a large number of news feeds for many exchange-listed products render the manual processing of news information unfeasible.

Moreover, traditional computer-based market research systems have remained as disparate systems. For instance, it is possible to obtain analyst consensus opinions and estimates from one market research system, and technical analyses of market data for buy and sell signals from another market research system. Because each system is separate, an investor must individually consider the recommendations of each system during an investment decision-making process. There is no systematic record of whether one system has been consistently superior at valuating a specific stock and thus should be given more weight in a future investment decision regarding the specific stock.

SUMMARY

In one exemplary embodiment, a metric for an exchange-listed product is estimated by a market research system based on sentiment regarding the exchange-listed product. The estimated metric may be displayed to a user via a website.

The market research system may be configured to receive data from an external server. The received data may be divided into one or more portions. In one embodiment, the metric to be estimated may be a price metric, and the exchange-listed product may be a stock. Furthermore, the external server may be a social media website, and the data may represent user-generated content from the social media website. In another embodiment, the metric to be estimated may be a number that may be proportional to the difference between a present market value of the exchange-listed product and the estimated metric for the exchange-listed product.

The market research system may be configured to determine whether a portion of the data represents a positive sentiment or a negative sentiment. The market research system may also be configured to estimate the metric for the exchange-listed product based on the determined sentiment for the first portion of the data, and to cause a display of the estimated metric for the exchange-listed product.

The market research system may also include a sentiment database that contains an association between one or more n-grams of a plurality of n-grams with a positive sentiment or a negative sentiment. In one embodiment, the market research system may be configured to determine whether the first portion of the data represents a positive sentiment or negative sentiment by determining whether an n-gram that is included in a sentiment database is also included in the first portion of the data.

The market research system may also be configured to identify one or more n-grams from the data, to count the frequency of each n-gram of the one or more n-grams in the data, to identify a subset of n-grams from the one or more n-grams based on the counted frequency, to associate one or more n-grams of the subset of n-grams with a positive sentiment or a negative sentiment, and to store the associations into the sentiment database.

In one embodiment, the estimating of the metric for the exchange-listed product may be performed by a computer-implemented forecast mechanism, and the sentiment database may be provided to the computer-implemented forecast mechanism. The market research system may be also configured to identify a second portion of the data, to determine whether the n-gram, which is included in the sentiment database, is included in the second portion of the data, and to associate the second portion of the data with the exchange-listed product and a historical metric for the exchange-listed product. The estimating to be performed by the computer-implemented forecast mechanism may be further based the second portion of the data and the associated historical metric.

In one embodiment, the market research system may also be configured to receive an analyst's consensus estimate of the price for the exchange-listed product for a first time period, to receive the analyst's consensus estimate of the price for the exchange-listed product for a second time period, to receive an actual price for the exchange-listed product for the first time period, and to adjust the estimated metric based on a difference between the analyst's consensus estimate of the price for the first time period and the received actual price for the exchange-listed product for the first time period, and the analyst's consensus estimate for the second time period.

In one embodiment, the market research system may also be configured to receive a first set of prices for the exchange-listed product for the first period, to receive a second set of prices for another exchange-listed product for the first period, to correlate the first set of prices with the second set of prices, and to adjust the estimated metric based on the correlation between the first and second set of prices.

In another exemplary embodiment, instructions for carrying out the technology described above may be stored into a non-transitory computer-readable storage medium. In yet another exemplary embodiment, instructions for carrying out the technology described above may reside in cloud storage, or may reside at a server at a cloud service provider.

DETAILED DESCRIPTION

The following description sets forth numerous specific configurations, parameters, and the like. It should be recognized, however, that such description is not intended as a limitation on the scope of the present technology, but is instead provided as a description of exemplary embodiments.

The embodiments described herein include an Internet-accessible market research system (MRS). The MRS receives information related to exchange-listed products through various data feed providers, and valuates exchange-listed products based on the information received from the data feed providers. As used herein, exchange-listed products may include, but are not limited to, stocks, funds, bonds, and commodities that are listed on one or more exchanges.

In some embodiments, the MRS may derive a target price or score for a stock by analyzing public sentiment, as reflected in the media, towards the stock. For example, the MRS may analyze user-generated content from a social media website, such as Facebook™. The MRS may also analyze content from a traditional media provider, such as Thomson Reuters™. Facebook™ and Thomson Reuters™ may provide data feeds to the MRS in natural language form. The MRS may translate the information in natural language form into levels of public sentiment towards a company and its products. The public sentiment levels may thus be used to derive a target price or score for a stock of the company.

For example, negative public sentiment toward a company may suggest a lower target price for the company's stock. As used here, a target price is a forward-looking prediction of the future price of an exchange-listed product, such as a unit of stock. The MRS may utilize a computer-forecast mechanism, such as a Support Vector Machine (SVM), to estimate target stock prices.

In some embodiments, the MRS may also consider analyst consensus estimates, and may also perform technical analyses based on market data in deriving a target price for a stock. The target price provided by the MRS may reflect all three processes of analysis (e.g., based on public sentiment, analyst consensus estimates, and technical market data). The MRS may favor a particular analysis, meaning that a target price estimated by the MRS may be biased towards the results of a particular process of analysis, if the process of analysis has been proven to be historically accurate for the stock based. After the target price of a stock is derived, the MRS may determine whether the stock is misvalued by comparing the stock's target price against its current market price.

1. Market Research System Architecture

Figure 1:
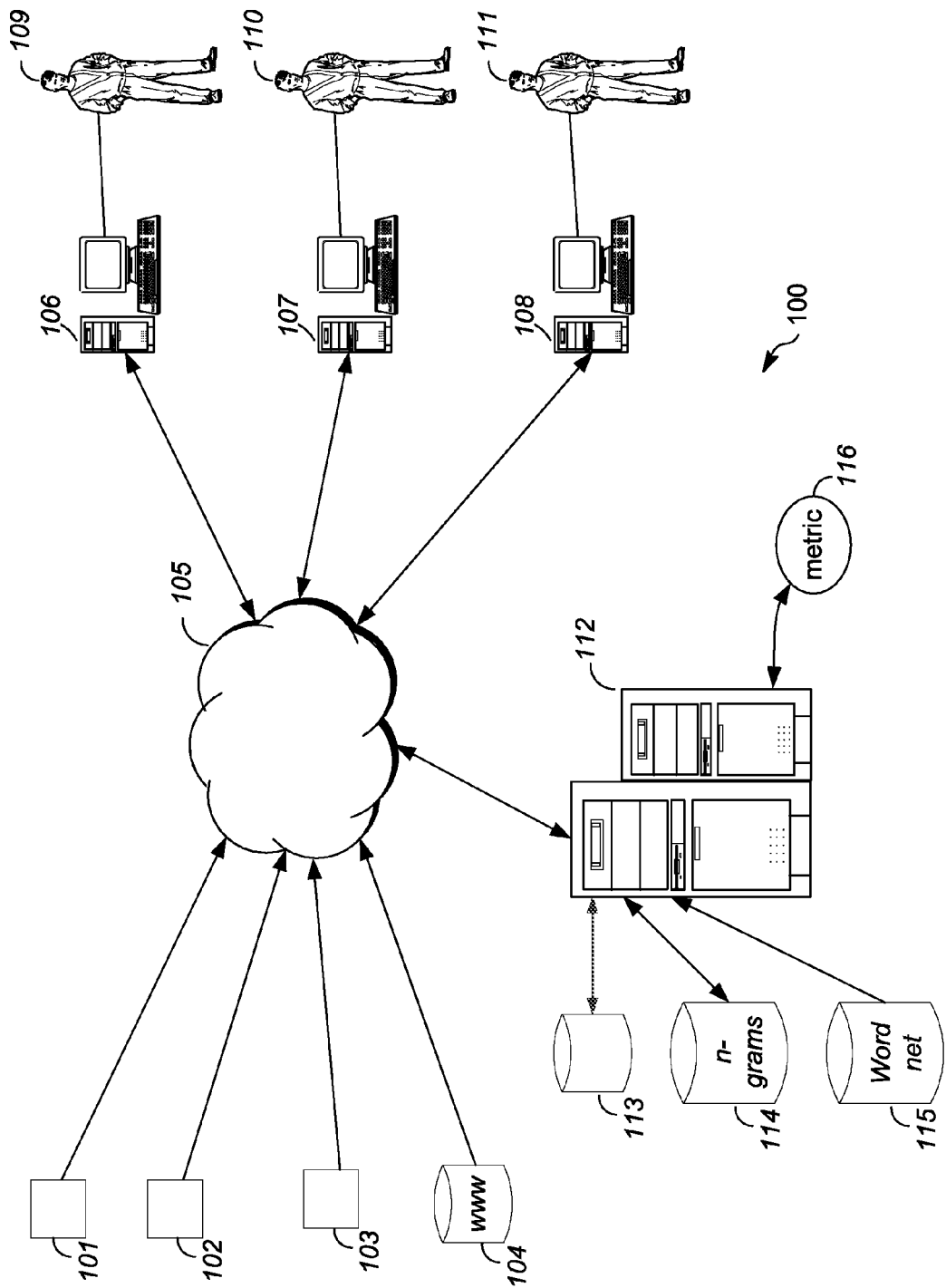
FIG. 1 depicts a system diagram of an exemplary embodiment of a market research system.

FIG. 1 illustrates an exemplary MRS 100. MRS 100 may include data feed providers 101-104 and computer 112. Computer 112 may act as a data feed receiver and may host back-end computer-readable instructions that support a website portion of an Internet-accessible market research system.

In general, a data feed provider may use a data feed mechanism to provide information to a data feed receiver. In one embodiment, data feed providers 101-104 provide data to data feed receiver 112 using, for example, RSS. One skilled in the art will appreciate that other data feed mechanisms, such as RDF, XML, CSV, and the like, may be used. One skilled in the art will further appreciate that MRS 100 may be configured to utilize new data feed mechanisms as they become available.

In one embodiment, data feed providers 101-102 may be social media websites that contain user-generated content. In general, user-generated content refers to content that is at least partially provided by a user of a website, as opposed to content that is provided by an administrator or a provider of a website. A data feed that contains user-generated content may be useful to MRS 100, since user-generated content, in the aggregate, may reflect public sentiment towards an exchange-listed product. In contrast, a data feed that contains only administrator-generated content may reflect the opinions of only a few content creators.

As illustrated in FIG. 1, social media websites that contain user-generated content include, but are not limited to Facebook™ 101, Twitter™ 102, Google blogs™, and the like. It should be noted, however, that MRS 100 may also process content that is not user-generated. For instance, a data feed provider may be a provider of analyst consensus estimates for exchange-listed products, such as Thomson Reuters™ 103, CNN™, Dow Jones™, and the like. Data feed provider 104 may also be a provider of technical market data, such as a stock exchange that provides streaming market information, or may be a news provider, such as Yahoo! News™. One skilled in the art will appreciate that MRS 100 may be configured to receive data from other data feed providers as new data feed providers come into existence or as existing data feed providers cease to operate.

Data feed providers 101-104 communicate with computer 112 through network 105. Network 105 may be the Internet, an intranet, or a network having both public and private networked portions. Users 109-111 may communicate with data feed providers 101-104 using computers 106-108. For example, user 109 may be a "blogger" at data feed provider 104, and may also maintain a user profile at data feed provider 101 (e.g., Facebook™). User 110 may be a professional contributor to data feed provider 103 (e.g., Thomson Reuters™), and may also contribute to discussion forums that are accessible on a website portion of a market research system website hosted by computer 112.

Computer 112 may store the contents of the discussion forum of a market research system into database 113, which may be used as another data feed provider to MRS 100. Computer 112 may also store a list of language-specific n-grams into an n-grams database 114. Computer 112 may access a lexical dictionary database 115, such as WordNet®, which is provided by Princeton University. Furthermore, computer 112 may derive and store metrics related to exchange-listed products in repository 116. A user of MRS 100 may access the metrics stored in repository 116 using, for example, a website portion of MRS 100.

2. Using Sentiment from Social Media

Figure 2:
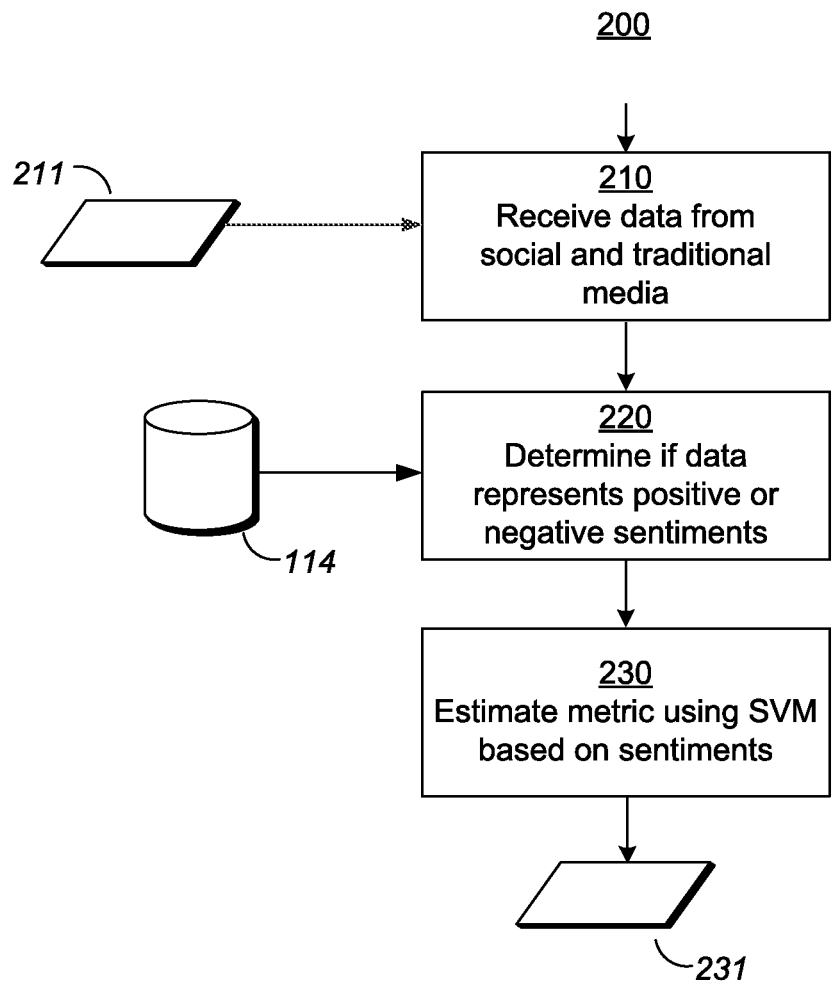
FIG. 2 depicts an exemplary process for deriving a metric for an exchange-listed product using sentiments.

FIG. 2 illustrates an exemplary process 200 that may be carried out by one embodiment of MRS 100 to estimate a metric for an exchange-listed product. Although the example provided below relates to the estimating of a target price for a stock, it should be understood that process 200 may be applied to estimate other metrics for other exchange-listed products. In the present embodiment, process 200 may be embodied in computer-readable instructions, which are components of MRS 100, running on computer 112 (FIG. 1).

At block 210, MRS 100 may receive data feeds 211 from one or more data feed providers. As discussed above, a number of data feed mechanisms may be used by MRS 100 to receive data feed 211. In one embodiment, at block 210, MRS 100 may use an RSS web feed to periodically obtain data from data feed providers.

Incoming data represented by data feed 211 may contain different types of information, such as textual information, numerical information, and the like. For example, social media websites such as Facebook™ and news websites such as CNN™ may provide textual information in natural language form. An incoming data feed may also include numerical information. For example, Thomson Reuters™ may provide price metrics information in numerical form.

Natural language generally refers to human speech (e.g., in written or spoken form) that arises in an unpremeditated fashion, and stands in contrast to logical languages such as computer programming languages. Whereas a computer programming language may be designed to be interpreted by a computer, information in natural language form may not as easily be interpreted by a computer.

At block 220, MRS 100 may determine a level of sentiment that is represented by the incoming data. Possible levels of sentiments include positive, negative, and neutral sentiment. It should be noted, however, that additional levels of sentiments, such as very positive, slightly positive, and the like, are possible. In addition, in some embodiments, sentiment levels may be indicated using a numerical value. For example, a value of +1.0 may be used to indicate strong positive sentiment, while a value of −1.0 may be used to indicate strong negative sentiment.

In one embodiment, MRS 100 may reference a database 114 of sentiment-tagged n-grams in order determine sentiments at block 220. Sentiment-tagged n-grams database 114 may contain approximately 10,000 unigrams and bigrams that are most frequently used in the data feeds received by MRS 100. Each unigram and bigram in sentiment-tagged n-grams database 114 may be associated with a positive, negative, or neutral sentiment. Put another way, each n-gram in sentiment-tagged n-grams database 114 may be "tagged" with a sentiment. It should be noted that sentiment-tagged n-grams database 114 may contain more than, or less than, 10,000 unigrams and bigrams. The creation of the sentiment-tagged n-grams database 114 is discussed in detail, below.

At block 220, MRS 100 may compare the contents of the incoming data against sentiment-tagged n-grams database 114. More specifically, MRS 100 may identify sentiment-tagged n-grams that are included in database 114 and also included in the incoming data represented by data feed 211. MRS 100 may count the number of times that a particular sentiment-tagged n-gram is included in the incoming data. In one embodiment, MRS 100 may organize the sentiment-tagged n-gram counts as an array of numbers that may be later used by a Support Vector Machine.

At block 230, the sentiment-tagged n-gram counts may be provided to a Support Vector Machine. In the field of machine learning, a Support Vector Machine generally refers to computer-implemented methods that may be used to analyze and recognize patterns in a set of input data. A Support Vector Machine may need to be trained, however, before it may produce meaningful analyses.

For example, a Support Vector Machine may be used as a classifier. If a Support Vector Machine is given a set of training examples, each identified as having one of two characteristics, the Support Vector Machine may become able to predict whether a future example has one or the other characteristic of the two characteristics. In Support Vector Machine parlance, an attribute that is used to train a Support Vector Machine (e.g., the characteristic in the training examples discussed above) may be called a feature.

At block 230, the Support Vector Machine may classify (i.e., predict) a price 231 for a stock using the sentiment-tagged n-gram counts, if the Support Vector Machine has been trained with examples of historical sentiment-tagged n-gram counts and historical prices for the particular stock. The training of a Support Vector Machine is discussed in detail, below.

3. Sentiment-Tagged N-Grams

Figure 3:
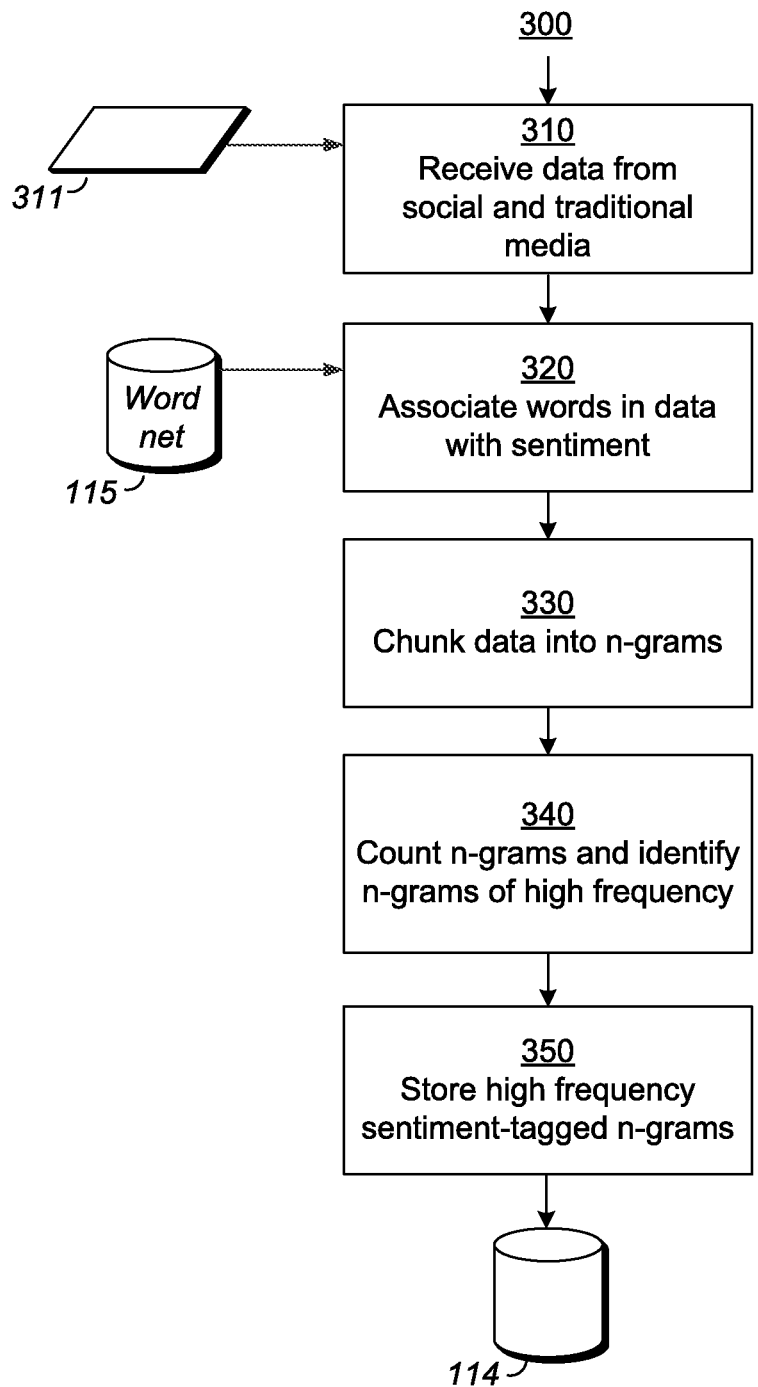
FIG. 3 depicts an exemplary process for creating a sentiment-associated n-gram database.

FIG. 3 illustrates an exemplary process 300 that may be carried out by one embodiment of MRS 100 to create a database 114 of sentiment-tagged n-grams. At block 310, MRS 100 may receive data feed 311 from one or more data feed providers. As discussed above, MRS 100 may receive a number of data feed providers, and the received data may include text in natural language form. For example, at block 310, a textual string, such as "My iPhone rocks," may be received.

At block 320, MRS 100 may associate certain words in the received data with a level of sentiment. For example, it may be useful to identify the word "rocks" as indicative of positive sentiment, and to store the word "rocks" in a sentiment-tagged n-grams database. MRS 100 may identify the word "rocks" as indicative of positive sentiment through the help of a lexical dictionary 115, such as WordNet®.

Figure 4:
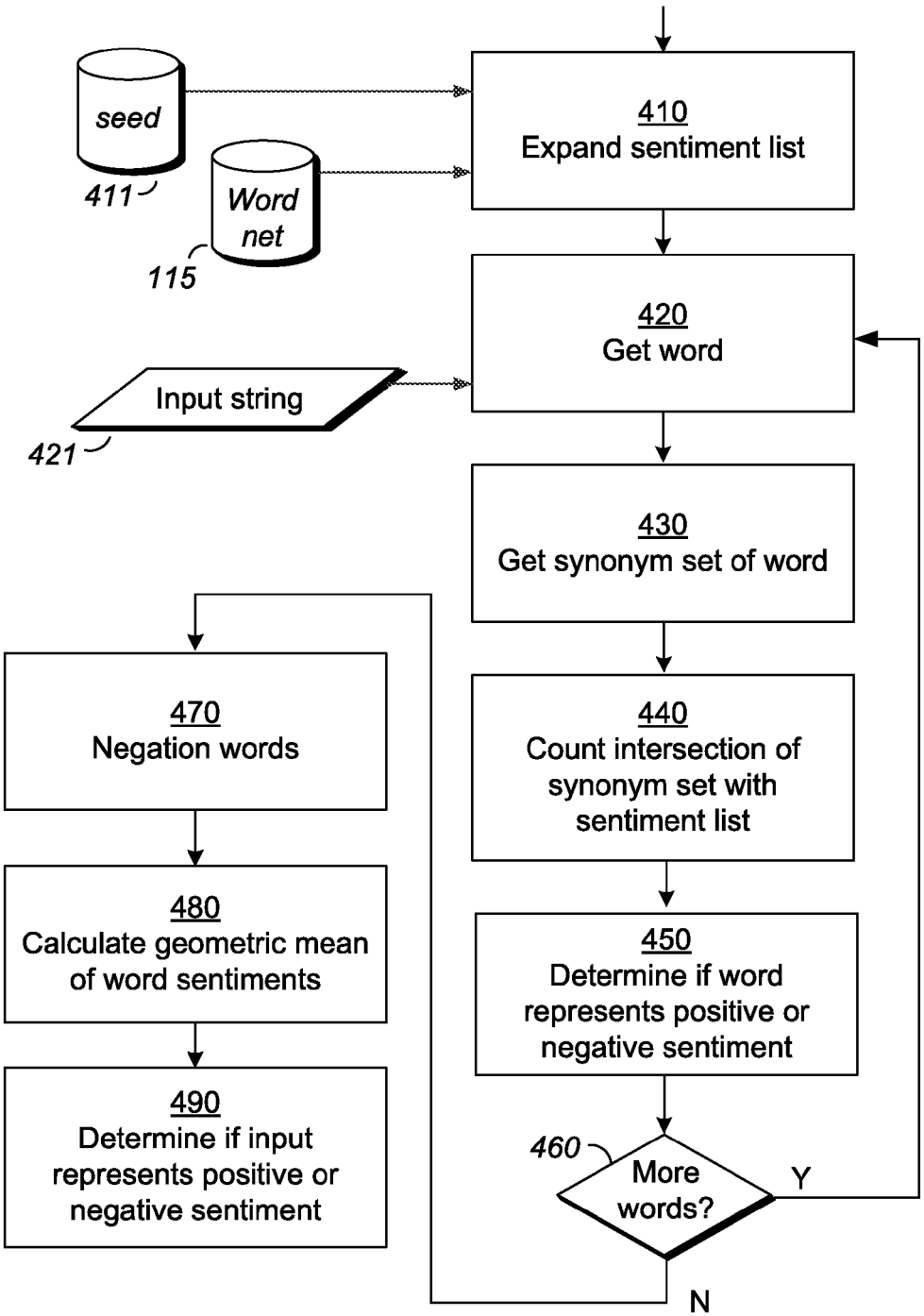
FIG. 4 depicts an exemplary process for determining positive and negative sentiment.

With continued reference to FIG. 3, and turning simultaneously to FIG. 4, an exemplary process 400 for carrying out block 320 of process 300 (FIG. 3) is described. In exemplary process 400, MRS 100 may create a sentiment list, and may use the sentiment list to determine whether an input string (e.g., "my iPhone rocks") indicates positive or negative sentiment.

At block 410, MRS 100 may create a sentiment list that includes a list of seed words and a set of synonyms for each of the seed words. Initially, a seed word and its sentiment may be manually identified by a speaker of the relevant language. For example, an English speaker may identify the word "excellent" as being strongly positive, and thus "excellent" may be used by MRS 100 as a seed word.

A set of synonyms to each seed word may be identified using lexical dictionary 115. For example, lexical dictionary 115 may identify that "good" is a synonym for "rocks." Working under the idea that the synonyms of a word that indicates positive sentiments may also indicate positive sentiment, MRS 100 determines a set of synonyms for each seed word of positive sentiment. Similarly, MRS 100 determines a set of synonyms for each seed word of negative sentiment. In one embodiment, a sufficient number of seed words may be manually provided to MRS 100 so that a sentiment list of approximately one thousand words may be created at block 410.

At block 420, MRS 100 may receive input string 421 and may identify a word within input string 421 for further processing. Input string 421 may be a portion of a data feed received from a data feed provider, such as "my iPhone rocks." Input string 421 may also contain a single word. In any event, at block 420, one word from input string 421 may be identified for downstream processing at a time. At block 430, a set of synonyms may be identified for the word using lexical dictionary 115. At block 440, MRS 100 may count the intersections of the set of synonyms with the synonyms in the sentiment list obtained at block 410. That is, MRS 100 may count the number of times that each synonym of the word appears in the list of positive synonyms and the list of negative synonyms obtained at block 410.

At block 450, MRS 100 may use the number of intersections to calculate a probability that the word indicates positive or negative sentiment. For example, at block 420 the word "abysmal" from input string 421 may be identified for further processing. At block 430, it may be determined the word "abysmal" has fifteen synonyms. At block 440, it may be determined that, of the fifteen synonyms, twelve synonyms are listed in the list of negative synonyms obtained at block 410, and one synonym is listed in the list of positive synonyms obtained at block 410. Thus, at block 450, it may be determined that there is an 80% probability that "abysmal" indicates negative sentiment, and a 7% probability that "abysmal" indicates positive sentiment. In one embodiment, MRS 100 may consider the word "abysmal" to indicate negative sentiment, because the probability of "abysmal" indicating a negative sentiment is greater than the probability of it indicating a positive sentiment, and/or the probability of "abysmal" indicating a negative sentiment is greater than a threshold value (e.g., 50%).

It should be noted that other thresholds may be used, and that a word may be considered neutral if the probability of the word as being indicative of positive or negative sentiment are both less than a certain threshold (e.g., 50%). Neutral words are potentially informative, because they can indicate the market adoption of a product because the use of a product name in a casual comment indicates public brand awareness.

At decision step 460, if input string 421 includes multiple words, blocks 420-450 may be repeated for each word within input string 421 in order to determine whether each word indicates a positive, negative, or neutral sentiment. In addition, it may be necessary to determine whether input string 421 contains negation words that affect the sentiment of an adjacent word, and it may also be necessary to determine an overall sentiment for input string 421 based on the sentiments of the words contained within input string 421.

At block 470, MRS 100 accounts for negation words in input string 421 that may affect the probability of a subsequent word being representative of positive or negative (e.g., non-neutral) sentiment. For example, while the word "good" represents positive sentiment, the string "not good" represents negative sentiment because the word "not" is a negation word that is adjacent to a non-neutral word (e.g., "good"). MRS 100 may maintain a list of negation words, such as "no," "not," "least," "never," and the like, in order to account for negation words during process 400. At block 470, MRS 100 may identify the occurrences of negation words in input string 421, and may reverse the sentiment probabilities of any word that appears adjacent to a negation word.

In one embodiment, MRS 100 may consider a word that appears immediately after a negation word to be adjacent to the negation word. For example, the word "good" may be identified at blocks 430-450 as having an 83% probability of being positive and 17% of being negative. At block 470, if "good" is seen immediately after "not," MRS 100 may instead assign the combination of "not good" a 17% probability of being positive and 83% of being negative.

At block 480, the overall sentiment of input string 421 may be classified by calculating the geometric mean of the probabilities of all the words in input string 421. In general, a geometric mean is a type of average, which reflects the central tendency or typical value of a set of numbers. To calculate the geometric mean of a set of numbers, the numbers in the set of numbers are multiplied to form a product. The n-th root of the product (where n is the count of numbers in the set) is then taken to arrive at the geometric mean for the set.

At block 490, MRS 100 determines whether input string 421, as a whole, represents positive or negative sentiment. In one embodiment, MRS 100 may consider input string 421 as representing positive sentiment, if the probability of input string 421 being positive, obtained at block 480, is greater than the probability of input string 421 being negative, also obtained at block 480, and/or the probability of input string 421 being positive is greater than a threshold value (e.g., 50%).

Referring back to FIG. 3, the contents of data feed 311 may be associated with levels of sentiment using process 400 (FIG. 4) discussed above. Once the contents of data feed 311 are associated with sentiments, the contents of data feed 311 may be separated into n-grams at block 330. In one embodiment, the contents of data feed 311 may be separated into unigrams and bigrams. In addition, stop words within data feed 311 may be ignored at block 330, meaning that stop words may not appear in the n-grams produced at block 330.

For example, at block 330, the following n-grams may be produced for the sentence "my iPhone rocks": "iPhone," "rocks," and/or "iPhone rocks" The word "my" may not be included in an n-gram because it may be considered a stop word. In one embodiment, at block 330 a static list of stop words which are commonly used in the relevant language may be maintained. Furthermore, it should be noted that at block 330, the contents of data feed 311 may be separated into n-grams of other lengths.

At block 350, MRS 100 may identify n-grams that are repeatedly included in data feed 311. In one embodiment, the ten thousand most frequently used n-grams from data feed 311, and their sentiments, are stored in sentiment-tagged n-grams database 114.

One skilled in the art would appreciate that a non-English sentiment-tagged n-gram database may also be developed. For example, social media websites such as Orkut in Latin America, StudiVZ in Germany, Cyworld in South Korea, QQ and renren in China, and V Kontakte in Russia may each provide data feeds that may be leveraged to develop a non-English sentiment-tagged n-grams database.

4. Training a Support Vector Machine

Figure 5:
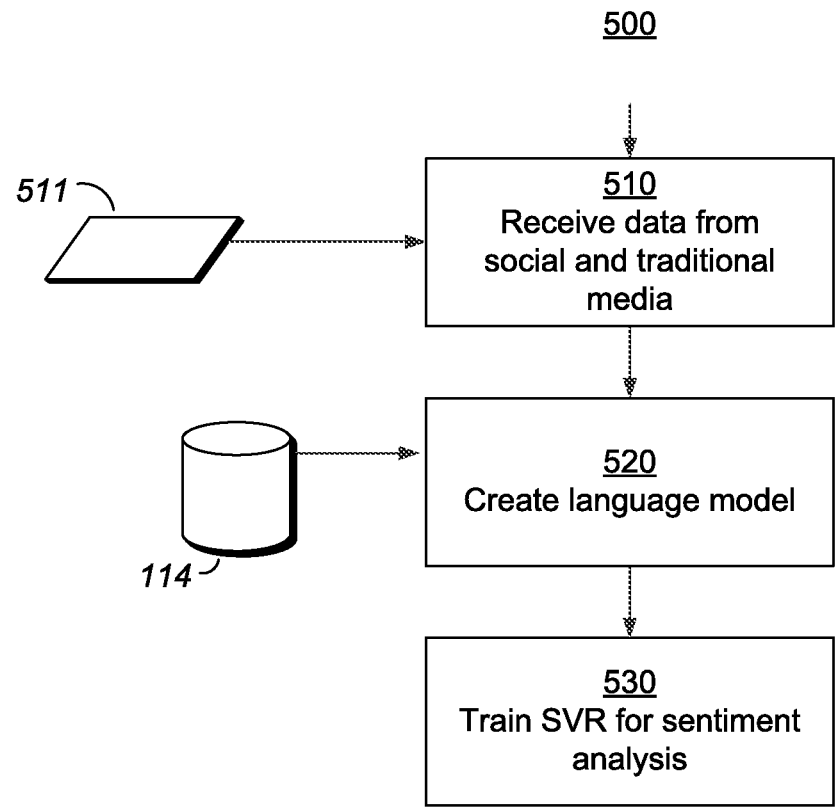
FIG. 5 depicts an exemplary process for training a Support Vector Machine.

FIG. 5 depicts an exemplary process 500 for training a Support Vector Machine. As discussed above, a Support Vector Machine may need to be trained before it can perform meaningful analyses. In one embodiment, process 500 may be used to train an implementation of a Support Vector Machine known as libSVM (Chang & Lin, 2001). At block 510 of process 500, MRS 100 may receive data feed 511 from one or more data feed providers. Data feed 511 may include information from the media as well as technical market data such as the market price of a stock. At block 520, MRS 100 may create one or more language models based on data feed 511 and sentiment-tagged n-grams database 114. At block 530, the language models and sentiment-tagged n-grams database 114 may be used to train the Support Vector Machine.

In general, a language model may include information about the usage of sentiment-tagged n-grams in data feed 511 and the price of a stock. At the same time, sentiment-tagged n-gram database 114 may provide information about the level of sentiment associated with the n-grams that appear in data feed 511. If a Support Vector Machine is trained (i.e., provided) with historical information about the use of sentiment-tagged n-grams in the media during a given time period and the price of a stock during the same time period, the Support Vector Machine may learn to correlate the use of certain sentiment-tagged n-grams to changes in stock prices. That is, a Support Vector Machine may be trained with a language model and a sentiment-tagged n-gram database, so that if the Support Vector Machine is later presented with an unfamiliar set of sentiment-tagged n-grams usages, the Support Vector Machine may be able to predict a stock price based on the correlations formed during the training process.

5. Language Models

In one embodiment, a language model may be created for a stock, for each day on which the stock is traded. Each language model may include a count of sentiment-tagged n-grams used in the data feed for a given day, and may also include the price of a stock for the day. In Support Vector Machine parlance, a language model may be referred to as a "training vector," because a language model may be used to train a Support Vector Machine. Moreover, the counts of sentiment-tagged n-grams in a language model may be referred to as "features." Finally, the price of a stock, which is to be predicted by a Support Vector Machine, may be referred to as a value that is to be "classified."

Figure 6:
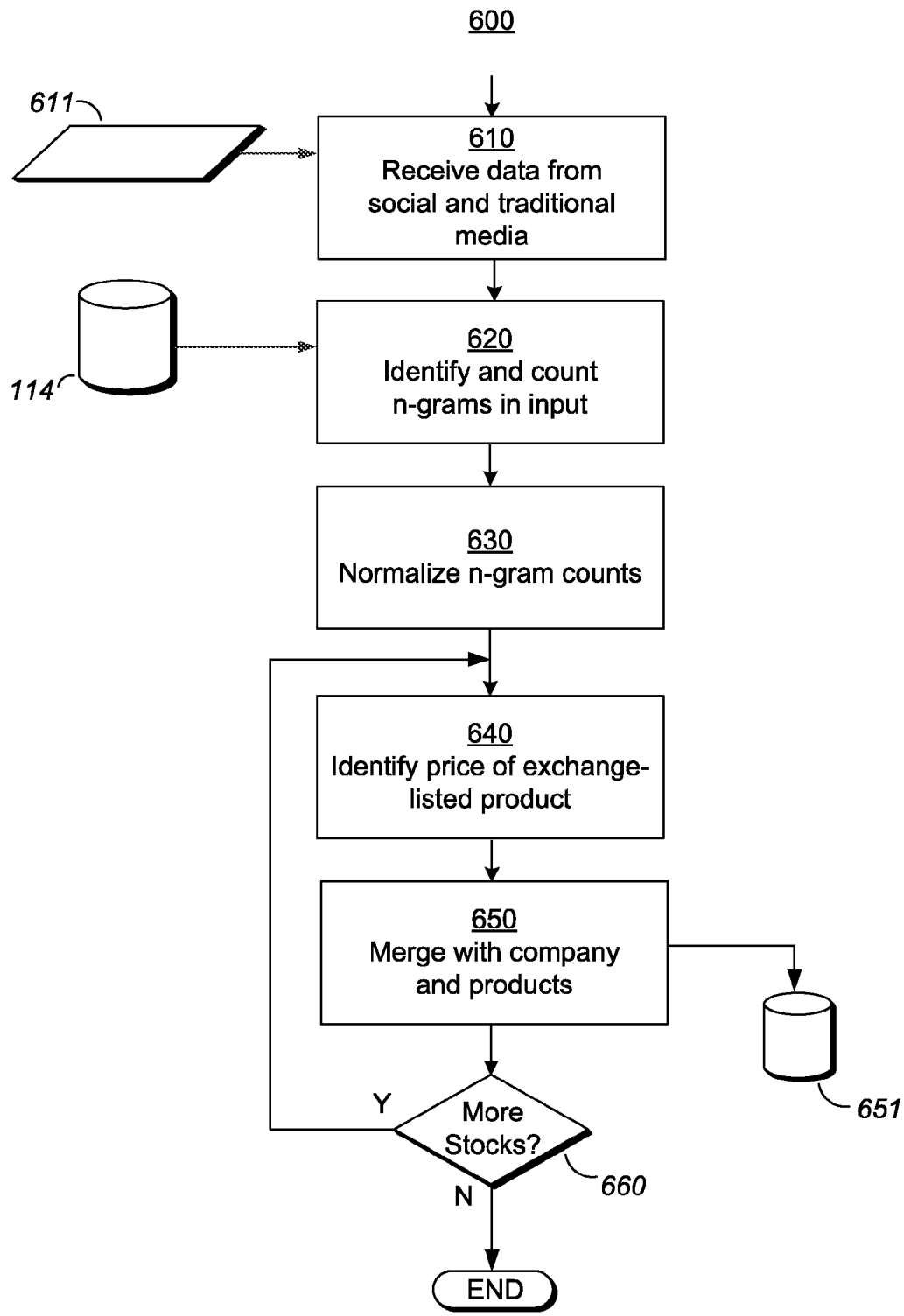
FIG. 6 depicts an exemplary process for creating a language model.

FIG. 6 depicts an exemplary process 600 for creating a language model 661. In one embodiment, process 600 may be performed once daily, so that one language model is produced for each stock of interest to MRS 100 on each day. However, it should be appreciated that process 600 may be performed at any desired time interval (e.g., bi-weekly, weekly, monthly, etc.). At block 610, MRS 100 may receive data feed 611 from one or more data feed providers. At block 620, MRS 100 may count, in data feed 611, the appearances of each sentiment-tagged n-gram that is included in sentiment-tagged n-grams database 114.

At block 630, the count of each sentiment-tagged n-gram used in data feed 611 may be normalized to the scale of 0.0 to +1.0. At block 640, the sentiment-tagged n-gram counts may be associated with a company's stock and its current market price. The current market price of a stock may be obtained from data feed 611 since data feed 611 may include technical market data. At block 650, the sentiment-tagged n-gram counts, the stock, and the stock price may be saved together with information related to the company and its product offerings to form language model 651.

At decision block 660, a decision may be made as to whether blocks 640-650 should be repeated to create additional language models. As discussed above, a language model may be specific to a stock for a given day. Once the counts of sentiment-tagged n-grams in data feed 611 is determined at blocks 610-630, the counts of sentiment-tagged n-grams may be associated with multiple stocks by repeating blocks 640-650. For example, a count of sentiment-tagged n-grams based on data feed 611 may be associated with the stock of Apple Incorporated having been priced at $200. The same count of sentiment-tagged n-grams may also be associated with the stock of another company, such as Cisco Systems Incorporated, having been priced at $20.

In one embodiment, a language model may optionally include additional metrics that may be included in data feed 611 from a data feed provider. For example, data feed 611 may include the results of a voting session in which the users of a discussion-board website may have participated. In addition, social media websites may include indicators of approval by its users, such as the "Like" functionality offered by Facebook™ and the "Digg" functionality offered by Digg™. Metrics that are based on the results of these functionalities may be saved with a language model.

6. Weighting of Multiple Estimates

Figure 7:
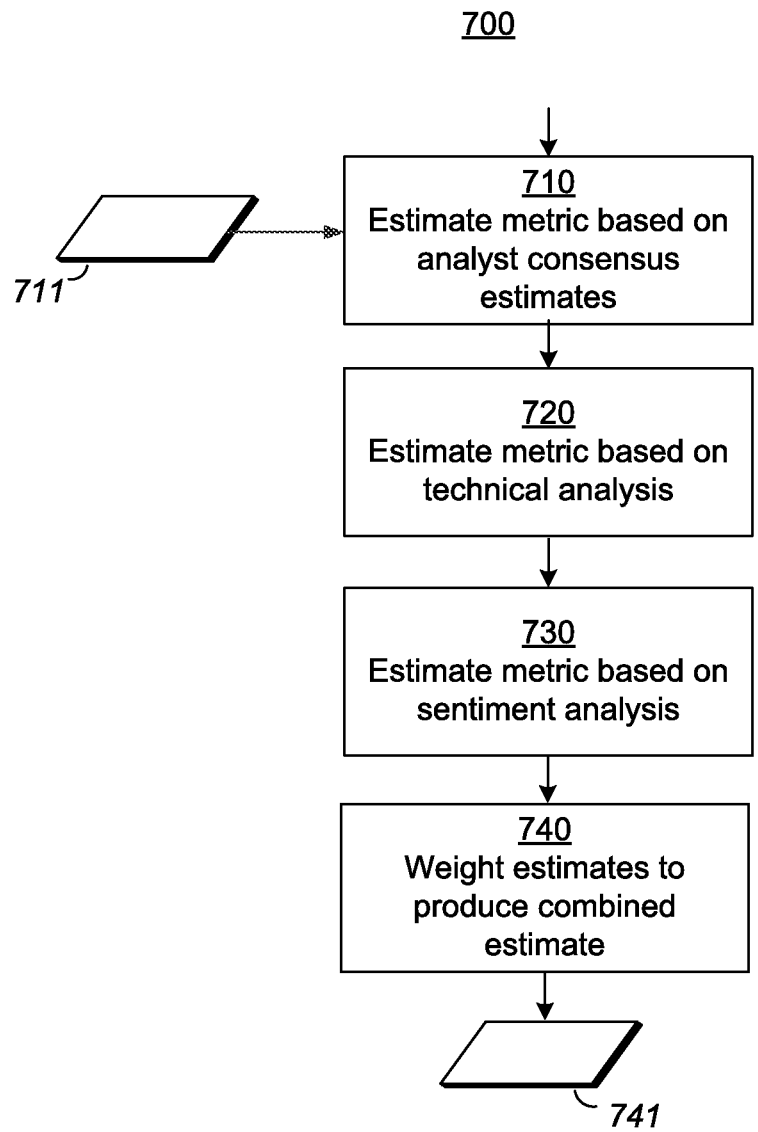
FIG. 7 depicts an exemplary process for combining estimated metrics.

MRS 100 may also analyze analyst consensus estimates and technical market data in order to estimate the target price of a stock. FIG. 7 depicts an exemplary process for using multiple processes 710-730 to estimate the target price of a stock.

In process 710, MRS 100 may analyze consensus financial forecasts that are provided by the professional securities analyst community. Globally, investment banks, agency brokerage firms, and independent research firms, spend significant effort to model and estimate a "fair value" for a company's stock. The fair value may be viewed as an analyst consensus estimate. In one embodiment, data feed 711 includes information from Thomson Reuters Knowledge Direct™, which provides financial estimates on revenue, EBITDA, net profit, EPS, recommendation, target price, long term growth rates, and the like, for a number of publicly-traded companies. It should be noted, however, that MRS 100 may also receive data feeds from other vendors.

In process 720, MRS 100 may analyze technical market data to identify price trends and relative pricing, so that it may estimate a target price for a stock. In one embodiment, process 720 may use intra-market price correlations between different asset classes related to the same underlying company in its technical market data analyses. For example, process 720 may analyze the price feed for the options chain related to a single company's shares in order to interpolate what the aggregate market believes to be the most likely target price for that company's stock. In addition to intra-market price correlations, process 720 may identify inter-market price correlations where one company's stock price has historically been highly correlated to another company's stock price. A divergence in the price correlation may indicate that one of the company's stock price is misvalued.

Furthermore, in process 730, MRS 100 may apply the processes discussed above to estimate the target price of a stock based on public sentiments towards the stock. As with any estimate, the accuracy of processes 710-730 may vary by day and by stock.

In process 740, MRS 100 may calculate a weighted average of the target price estimates obtained in processes 710-730. Specifically, MRS 100 may review the past performance of processes 710-730 with respect to a stock by comparing the historical stock prices against past estimates that were created using processes 710-730 for the stock.

For example, in process 740, MRS 100 may measure the difference between a set of target prices estimated using process 710 (i.e., consensus estimates) against a set of actual historical prices for a stock. In one embodiment, one or more statistical tests may be used to obtain an average error for process 710. For example, MRS 100 may calculate the mean square error of process 710 by determining the average difference between the estimated target prices and the actual historical prices for the stock. MRS 100 may also calculate a statistical correlation coefficient between the set of estimated prices and the set of historical prices for the stock. Furthermore, MRS 100 may perform a Granger causality test between the set of estimated prices and the set of historical prices for the stock.

The margins of errors obtained using the three statistical tests discussed above may be further averaged to obtain an average margin of error for process 710. Similarly, block 740 may also obtain the margins of error for processes 720 and 730 by repeating the statistical tests discussed above.

Once the average margins of error for processes 710-730 are obtained for a stock, each average margin of error may be normalized to a value between 0.0 and 1.0. At block 740 this set of normalized values may be used as the weight coefficient to each of the target price estimates produced by processes 710-730. In other words, estimated target price 741 may be a weighted average of the estimates by processes 710-730. The estimated target price 741 may be displayed on a user via a web-site portion of MRS 100.

7. Tradepop Rating

The MRS may also produce a proprietary metric for each exchange-listed product that may be analyzed by the system. The proprietary metric may be an individual numerical value that may be assigned to each exchange-listed product, and may be proportional to the difference between the exchange-listed product's current price and target price. The proprietary metric may also account for the average margins of error discussed above. The MRS may use the proprietary metric is an indication to its users that an exchange-listed product may be misvalued.

In one embodiment, the proprietary metric may be called a Tradepop Rating, and may range from −100 to +100. The Tradepop Rating is proportional to the difference between the current price and the target price of an exchange-listed product. The largest negative difference between the current price and the future target price will receive the lowest Tradepop Rating number, and vice versa. For example, the Tradepop Rating may be expressed as a function of:

$$E_1(Forecast_1 - MP) + E_2(Forecast_2 - MP) + E_3(Forecast_3 - MP) \quad (EQ.\ 1)$$

where $Forecast_1$ and $E_1$ denote a forecast based on analysts consensus estimates and an average margin of error for the forecast. $Forecast_2$ and $E_2$ denote a forecast based on sentiments and an average margin of error for the forecast. $Forecast_3$ and $E_3$ denote a forecast based on predictions by users of MRS 100 and an average margin of error for the forecast. In addition, MP denotes the market price for the particular stock.

The result of EQ. 1 may be normalized to a value between −100 and +100 so that the Tradepop Ratings to different exchange-listed products may be compared. The calculated Tradepop Ratings may be displayed on a user via a web-site portion of MRS 100.

Figure 8:
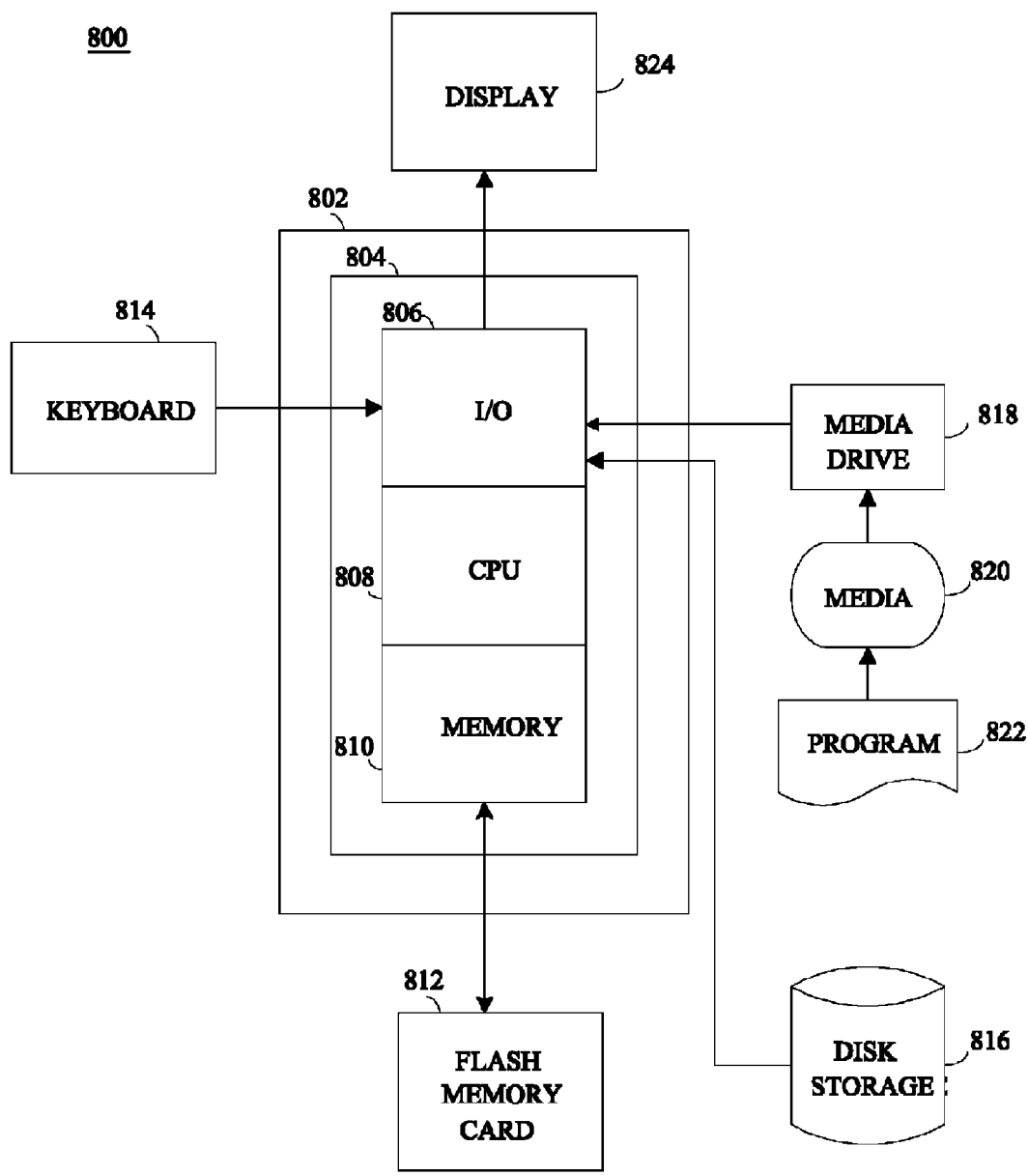
FIG. 8 depicts an exemplary computing system.

FIG. 8 depicts an exemplary computing system 800 configured to perform any one of the above-described processes. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform the above-described processes. The main system 802 includes a motherboard 804 having an I/O section 806, one or more central processing units (CPU) 808, and a memory section 810, which may have a flash memory card 812 related to it. The I/O section 806 is connected to a display 824, a keyboard 814, a disk storage unit 816, and a media drive unit 818. The media drive unit 818 can read/write a computer-readable medium 820, which can contain programs 822 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A computer implemented method, comprising:
    estimating a first metric based on analyst consensus estimates, wherein the analyst consensus estimates include a first analyst consensus estimate of a price for an exchange-listed product for a first time period and a second analyst consensus estimate of the price for the exchange-listed product for a second period of time;
    estimating a second metric based on technical market data;
    estimating a third metric based on public sentiment analyses; and
    producing a combined estimate based upon the first metric, the second metric and the third metric;
    wherein the combined estimate is a price for an exchanged listed product, and
    wherein each estimating operation and the producing operation are executed by a computer.

2. The computer implemented method of claim 1 wherein producing includes producing a combined estimate based upon weighted values of the first metric, the second metric and the third metric.

3. The computer implemented method of claim 1 further comprising:
    providing a rating proportional to the difference between a current price and a target price of an exchange-listed product.

4. The computer implemented method of claim 3 wherein the rating is expressed as a function of:

$$E_1(Forecast_1 - MP) + E_2(Forecast_2 - MP) + E_3(Forecast_3 - MP)$$

where $Forecast_1$ and $E_1$ denote a first forecast based on analyst consensus estimates and an average margin of error for the first forecast, $Forecast_2$ and $E_2$ denote a second forecast based on sentiments and an average margin of error for the second forecast, and $Forecast_3$ and $E_3$ denote a third forecast based on predictions by users and an average margin of error for the third forecast, and MP denotes the market price for the particular stock.

5. The computer implemented method of claim 4 wherein the rating is normalized to a value between −100 and +100.

6. A computer implemented method, comprising:
estimating a first metric based on analyst consensus estimates;
estimating a second metric based on technical market data, wherein the technical market data includes an actual price for an exchange-listed product;
estimating a third metric based on public sentiment analyses; and
producing a combined estimate based upon the first metric, the second metric and the third metric;
wherein the combined estimate is a price for the exchanged listed product, and
wherein each estimating operation and the producing operation are executed by a computer.

7. The computer implemented method of claim 6 wherein the technical market data further includes a second actual price for another exchange-listed product and a correlation of the actual price and the second actual price.

8. A computer implemented method, comprising:
estimating a first metric based on analyst consensus estimates;
estimating a second metric based on technical market data;
estimating a third metric based on public sentiment analyses, wherein the public sentiment analyses are derived from the evaluation of data feeds; and
producing a combined estimate based upon the first metric, the second metric and the third metric;
wherein the combined estimate is a price for the exchanged listed product, and
wherein each estimating operation and the producing operation are executed by a computer.

9. A computer implemented method, comprising:
estimating a first metric based on analyst consensus estimates;
estimating a second metric based on technical market data;
estimating a third metric based on public sentiment analyses, wherein the public sentiment analyses include positive and negative sentiment indicators; and
producing a combined estimate based upon the first metric, the second metric and the third metric;
wherein the combined estimate is a price for the exchanged listed product, and
wherein each estimating operation and the producing operation are executed by a computer.

10. The computer implemented method of claim 9 wherein the public sentiment analyses include neutral sentiment indicators indicative of public brand awareness.

11. The computer implemented method of claim 9 wherein the public sentiment analyses are derived from seed words and synonyms for the seed words.

12. The computer implemented method of claim 9 wherein the public sentiment analyses include evaluations of negation words.

13. The computer implemented method of claim 9 wherein the public sentiment analyses include an evaluation of an overall sentiment of an input string.

14. The computer implemented method of claim 9 wherein the public sentiment analyses include an evaluation of the geometric mean of sentiment probabilities of all words in an input string.

* * * * *